United States Patent [19]

Dockery

[11] Patent Number: 5,142,397
[45] Date of Patent: Aug. 25, 1992

[54] SYSTEM FOR EXTENDING THE EFFECTIVE OPERATIONAL RANGE OF AN INFRARED REMOTE CONTROL SYSTEM

[76] Inventor: Devan T. Dockery, Rte. 8, Box 14, Defuniak Springs, Fla. 32433

[21] Appl. No.: 728,776

[22] Filed: Jul. 8, 1991

Related U.S. Application Data

[63] Continuation of Ser. No. 460,808, Jan. 4, 1990, abandoned.

[51] Int. Cl.⁵ .......................................... H04B 10/00
[52] U.S. Cl. .................................... 359/145; 359/146; 358/194.1; 455/352; 341/176
[58] Field of Search ............... 358/194.1; 359/142, 359/145, 146, 174, 176; 455/352; 341/176; 340/825.72

[56] References Cited

U.S. PATENT DOCUMENTS

| | | | |
|---|---|---|---|
| 4,709,412 | 11/1987 | Seymour et al. | 455/603 |
| 4,809,359 | 2/1989 | Dockery | 455/603 |
| 4,864,647 | 9/1989 | Harrington | 455/603 |
| 4,897,883 | 1/1990 | Harrington | 455/603 |

FOREIGN PATENT DOCUMENTS 0162846  6/1990  Japan .................................. 359/145

Primary Examiner—Edward L. Coles, Sr.
Assistant Examiner—Kinfe-Michael Negash
Attorney, Agent, or Firm—Kenyon & Kenyon

[57] ABSTRACT

A system is disclosed for extending the effective operational range of an infrared remote control system. The infrared remote control system is of the type having a remote control unit with a housing defining an interior component compartment. An infrared transmitter is at least partially contained within the component compartment while the controlled device includes an infrared receiver. The extender system includes a first repeater which is contained within the component compartment closely adjacent the infrared transmitter. An infrared receiver is contained within the first repeater and generates an output signal representative of the infrared signal received from the remote control unit. A radio transmitter at the first repeater then transmits a radio signal to a radio receiver at a second repeater which is physically adjacent the controlled device or devices. The radio receiver generates a second electrical signal representative of the received radio signal and this second electrical signal activates an infrared transmitter which transmits an infrared signal to the controlled device.

1 Claim, 3 Drawing Sheets

SYSTEM FOR EXTENDING THE EFFECTIVE OPERATIONAL RANGE OF AN INFRARED REMOTE CONTROL SYSTEM

This application is a continuation of application Ser. No. 07/460,808, filed Jan. 4, 1990 now abandoned.

BACKGROUND OF THE INVENTION

I. Field of the Invention

The present invention relates to a system for extending the effective operational range of an infrared remote control system of the type used with audio and video equipment.

II. Description of the Prior Art

There are many types of previously known remote controlled electronic devices which utilize an infrared signal between a remote control unit and the controlled device. Such controlled units include, for example, video cassette recorders, television sets, audio amplifiers, and the like.

One disadvantage of these previously known infrared remote control systems is that the operational range of the remote control unit is limited to a line of sight path between the infrared transmitter at the remote control unit and the infrared receiver at the controlled device. In many instances, however, it is highly desirable to operate the remote controlled device from more than one room.

One type of previously known device for allowing the controlled device to be operated from more than one room is disclosed in U.S. Pat. No. 4,509,211 which issued on Apr. 7, 1985 to Robbins. In the Robbins patent, the range for the infrared remote control system is effectively increased by utilizing a pair of transducer units which are electrically connected together by a wire transmission line. This previously known system, however, is disadvantageous since it is necessary to physically connect the transducer units together with a hard wire or transmission line. This oftentimes requires drilling holes in walls, floors, and the like.

An improvement over the Robbins patent is disclosed in my prior U.S. Pat. No. 4,809,359 which issued on Feb. 28, 1989. In my prior patent, a repeater was attached to the remote control unit which converted the infrared signal from the remote control unit to a radio signal. This radio signal was, in turn, received by a second repeater physically adjacent the controlled device. This second repeater reconverted the radio signal to an infrared transmission which was then transmitted to and received by the controlled device. Since the radio waves are capable of passing through walls, it was possible to operate the controlled device from a remote control unit that was not within the line of sight of the remote controlled device.

In operation, the first repeater of my device, i.e. the repeater which converted the infrared signal from the remote control unit into a radio signal, was contained within the housing which was then attached to the housing of the remote control unit. While this construction performed adequately, in some cases the extender housing became detached from the remote control unit and then became lost or misplaced. Furthermore, since there is little standardization of the physical shape of the housings for the infrared remote control units, it was necessary to design a different housing for the extender unit for different types of remote control units. This then increased the overall cost of production for my extender system.

SUMMARY OF THE PRESENT INVENTION

The present invention provides a system for extending the effective operational range of an infrared remote control system which overcomes the above mentioned disadvantages of the previously known devices.

In brief, as disclosed in my prior patent which is incorporated herein by reference, the system of the present invention comprises a first repeater which receives the infrared signal from the remote control unit and converts the infrared signal into a radio signal. A second repeater is positioned physically adjacent the controlled device which receives this radio signal and reconverts the radio signal into an infrared signal. This infrared signal is then received by the controlled device in the desired fashion.

The remote control unit includes a housing which defines an interior component compartment and in which the electronic components for the remote control unit are contained. Additionally, at least part of the infrared emitter for the remote control unit is contained within this housing compartment.

The first repeater of the extender system, i.e. the repeater which converts the infrared signal from the remote control unit to a radio signal, is also physically contained within the housing compartment of the remote control unit so that the means in the first repeater for receiving the infrared signal is positioned closely adjacent the infrared emitter of the remote control unit. Additionally, a battery within the housing of the remote control unit powers not only the remote control unit, but also the first repeater of the extender system.

Since the first receiver is contained within the interior of the housing compartment, it is not possible that the first repeater becomes detached from the remote control unit. Furthermore, since the first receiver is contained within the interior of the housing, it is unnecessary that the first repeater have its own housing. As such, a single repeater will operate with a wide variety of different infrared remote control units. It is also possible to use the same electrical power source, typically a battery, to power both the remote control unit as well as the first repeater thereby further reducing the overall cost of the repeater system of the present invention. dr

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
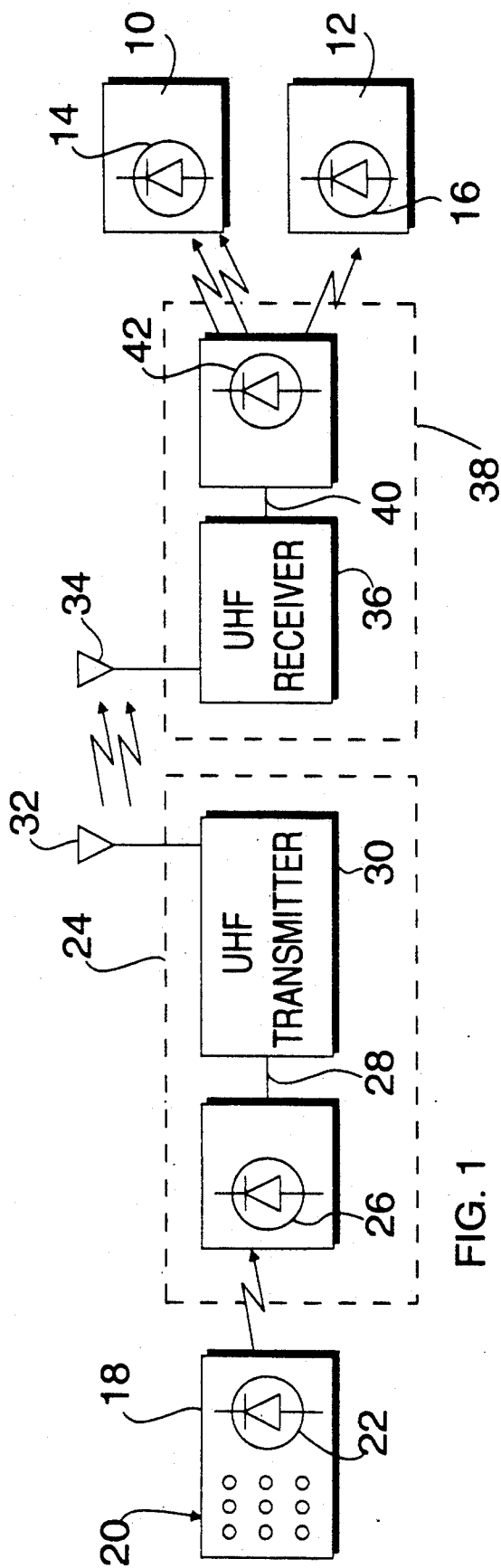
FIG. 1 is a block diagrammatic view illustrating a preferred embodiment of the present invention.
Figure 2:
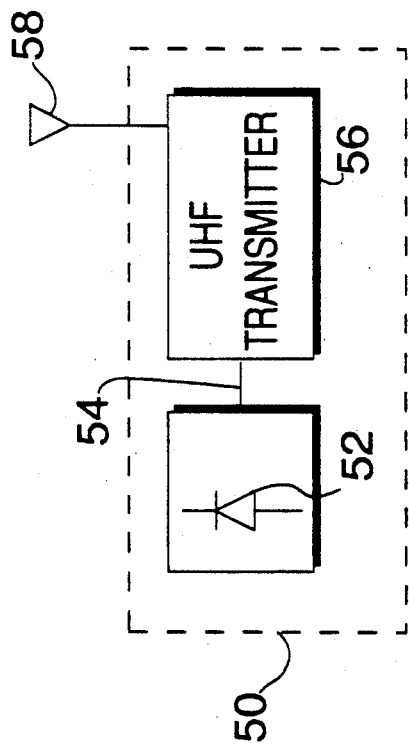
FIG. 2 is a block diagrammatic view illustrating a second repeater.

With reference to FIGS. 1 and 2, a preferred embodiment of the present invention is thereshown and comprises one or more controlled devices 10 and 12, such as a video recorder, video disc player, stereo system components or the like. Furthermore, each controlled device 10 and 12 includes a photodetector 14 and 16, respectively, each of which is adapted to receive an infrared signal to control the operation of the controlled device 10 or 12.

A remote control unit 18 is typically used to control the operation of the controlled devices 10 and 12. The remote control unit 18 typically includes a key pad 20 which, when pressed, generates an infrared signal from an infrared emitter 22. As is well known in the art, an infrared remote control unit is a line of sight device, i.e. the remote control unit 18 must be within the line of sight of either photodetector 14 or 16 of the controlled devices 10 and 12, respectively, in order to operate them.

In order to overcome this limitation of the previously known infrared remote control systems, the present invention provides a system to extend the effective range of an infrared remote control system. As shown in the drawing, the system comprises a first repeater 24 having an infrared receiver or photodetector 26 which can be positioned in an area or room remote from the controlled devices 10 and 12. The photodetector 26 is responsive to the infrared signal from the remote control unit 18 and generates an electrical signal at its output 28 which is representative of the infrared signal from the remote control unit 18. This electrical signal on the output 28 is electrically connected as an input signal to an ultra high frequency (UHF) radio transmitter 30 which generates a radio signal from its antenna 32 which is representative of the infrared signal from the remote control unit 18.

The radio signal from the transmitter 30 is, in turn, received by the antenna 34 of an ultra high frequency receiver 36 at a second repeater 38. This second repeater 38 is positioned physically adjacent the controlled devices 10 and 12.

The radio receiver 36 generates an electrical signal on its output 40 which is representative of the received radio signal from the transmitter 30. This output signal 40 from the receiver 36 then activates an infrared emitter 42 which transmits an infrared signal to the photodetectors 14 and 16 respectively associated with the control units 10 and 12 to thereby control the operation of the controlled units 10 and 12 in the desired fashion.

Still referring to FIGS. 1 and 2, additional repeaters 50 (only one additional repeater is illustrated in the drawing) can also be provided in different areas remote from the controlled devices 10 and 12. Each additional repeater 50 includes an infrared photodetector 52 which, like the photodetector 26, provides an electrical signal on its output 54 as an input signal to an ultra high frequency (UHF) transmitter 56. The transmitter 56, in turn, generates a radio signal from its antenna 58 which is received by the antenna 34 on the radio receiver 36 thus controlling the devices 10 and 12 in the previously described fashion. Any number of remote repeaters 50 can, of course, be employed without the need for multiplexing the receiver 36.

Figure 3:
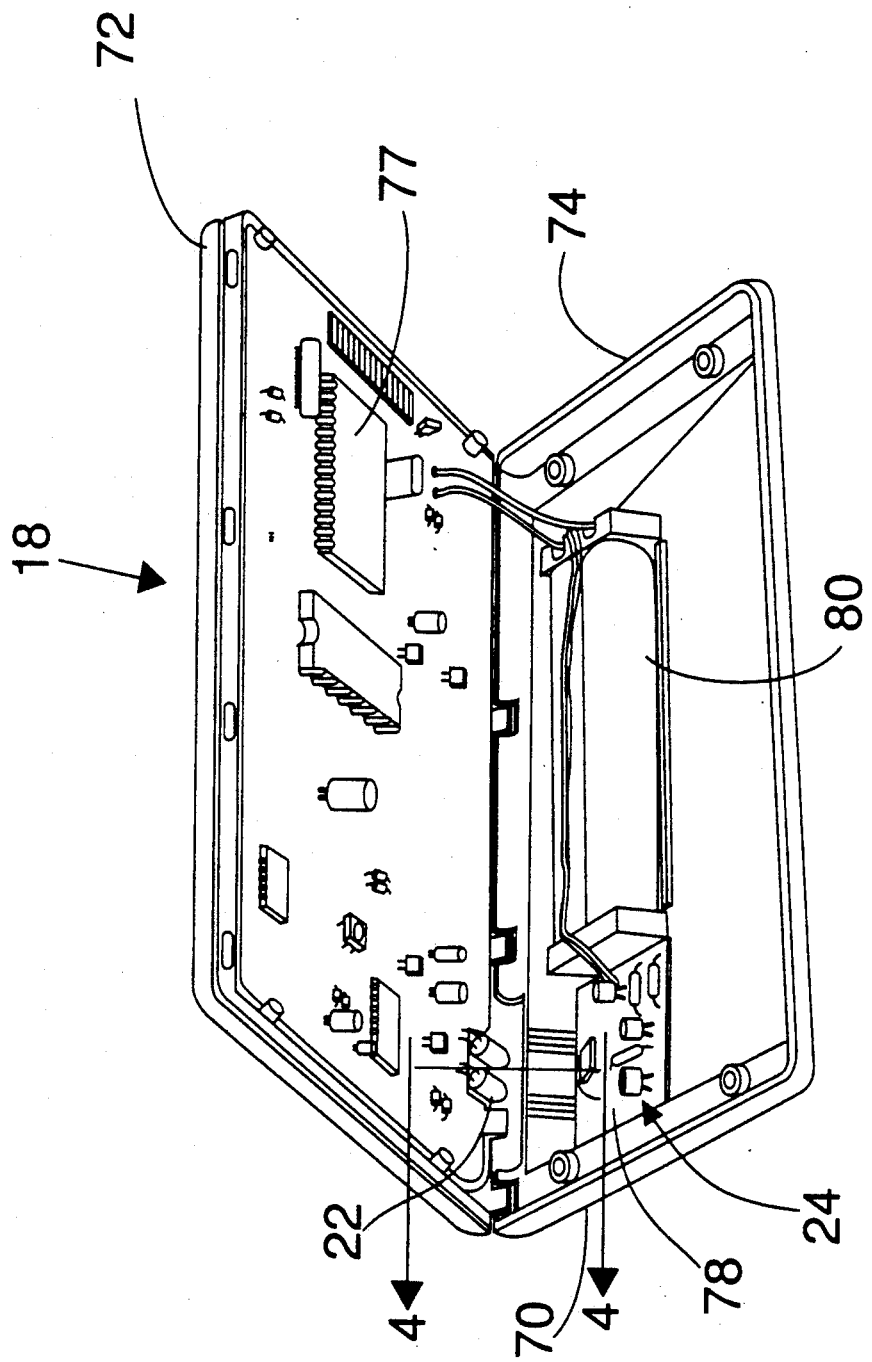
FIG. 3 is an elevational view illustrating the preferred embodiment of the present invention.
Figure 4:
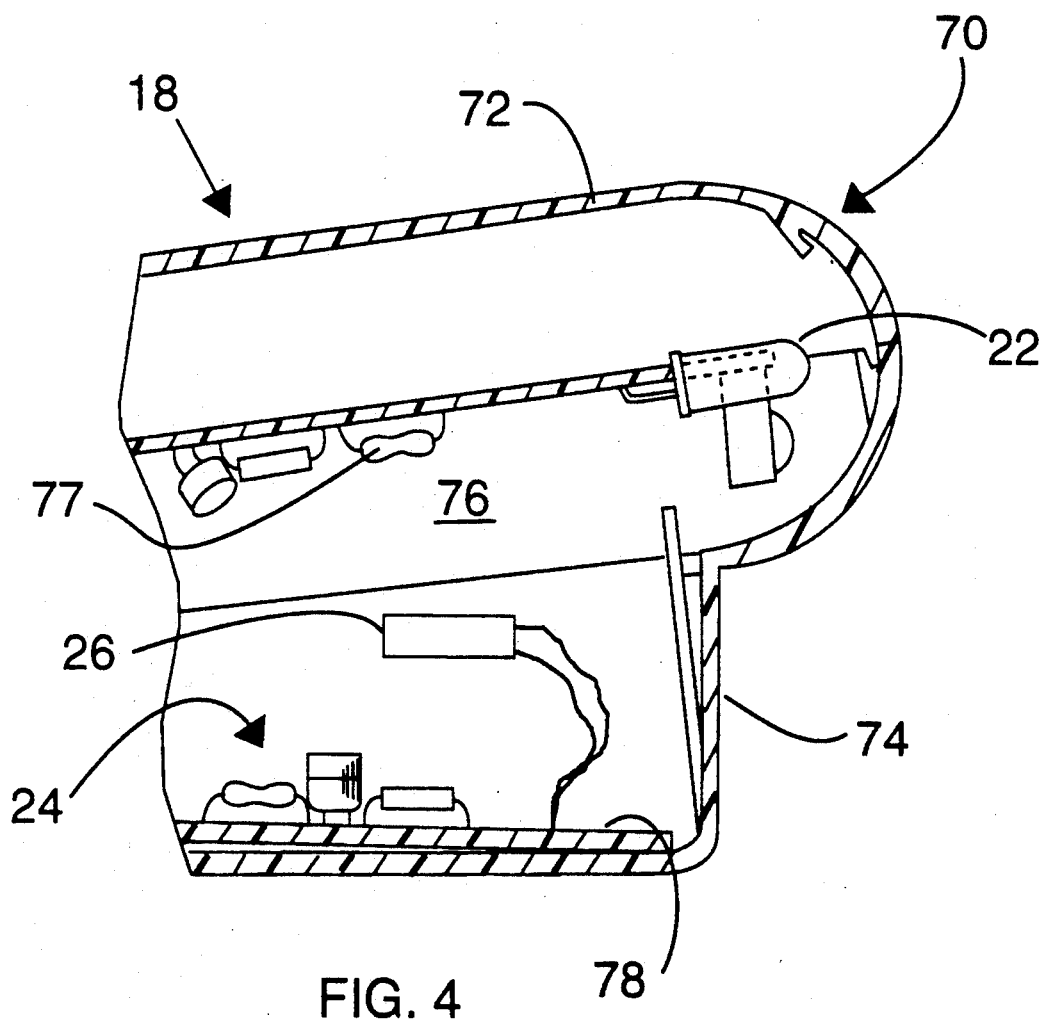
FIG. 4 is a fragmentary, partial sectional view illustrating a portion of the preferred embodiment of the present invention.

With reference now to FIGS. 3 and 4, the remote control unit 18 includes a housing 70 which, as shown in FIG. 3, is formed from two housing sections 72 and 74. The housing sections 72 and 74, when secured together (FIG. 4), form an interior housing compartment 76 in which the electronic components 77 of the remote control unit 18 are contained. Additionally, at least part of the infrared o emitter 22 for the remote control unit is contained within the housing compartment 76.

The first repeater 24 includes a number of electronic components which are assembled on a circuit board 78. This circuit board is then mounted within the housing compartment 76 of the remote control unit 18. Furthermore, as best shown in FIG. 4, the circuit board 78 is mounted so that the infrared receiver 26 on the circuit board 78 is positioned closely adjacent the infrared emitter 22 of the remote control unit. Consequently, the infrared receiver 26 receives the infrared signal from the emitter 22 in the desired fashion.

Referring again to FIG. 3, a common battery 80 is used to power not only the components 77 for the remote control unit 18, but also the electronic components for the repeater 24. Consequently, the present invention eliminates the necessity of having a separate battery for both the remote control unit 18 and the first repeater 24.

As can be seen from the foregoing, a primary advantage of the present invention is that, since the circuit board 78 is contained within the housing compartment 76 of the remote control unit 18, a separate housing for the first repeater is unnecessary. Furthermore, the same repeater circuit board 78 can fit within a number of different housing compartments 76 of different remote control units 18 without any modification, whatsoever, to the circuit board 78.

A still further advantage of the present invention is that a common power source is used to power both the remote control unit as well as the first repeater. This prevents duplication not only of the battery, but also of the components associated with the battery, such as the battery compartment.

Having described my invention, however, many modifications thereto will become apparent to those skilled in the art to which it pertains without deviation from the spirit of the invention as defined by the scope of the appended claims.

I claim:

1. In combination with an infrared remote control system, an extender system for extending the effective operational range of said remote control system, said remote control system having a remote control unit with an infrared transmitter and a controlled device having an infrared receiver remote from the infrared transmitter, the remote control unit having a housing with an interior component compartment and a first infrared emitter at least partially contained within said compartment, said extender system comprising:
   (a) a first repeater contained within said compartment physically adjacent said first infrared emitter, said repeater having
      (1) means for receiving a first infrared signal from said first infrared emitter and for generating a first electrical signal representative thereof,
      (2) means responsive to said first electrical signal for transmitting a first radio signal representative of said first electrical signal, and
   (b) a second repeater physically adjacent the controlled device having
      (1) means for receiving said first radio signal and for generating a second electrical signal representative thereof, and
      (2) means responsive to said second electrical signal for transmitting a second infrared signal representative thereof toward the controlled device;
   wherein said means for receiving said first infrared signal comprises an infrared photodetector;
   wherein said means for transmitting said second infrared signal comprises a second infrared emitter; and
   wherein a signal electrical power source electrically powers both the remote control unit and the repeater contained within said remote control unit.

* * * * *